Patented May 12, 1942

2,282,303

UNITED STATES PATENT OFFICE 2,282,303

PIGMENT TREATMENT

John Owen Morrison, Chatham, and Ben H. Perkins, Jersey City, N. J., assignors to E. I. du Pont de Nemours & Company, Wilmington, Del., a corporation of Delaware No Drawing. Application June 1, 1940, Serial No. 338,381

11 Claims. (Cl. 106—304)

This invention relates to a process for the production of improved pigment materials. More particularly it relates to the production of pigment materials, especially iron blue pigments, of improved texture.

It has been customary in the manufacture of dry pigment materials which have been precipitated from aqueous media in the form of very small particles to isolate the pigment in the form of aqueous pastes containing varying amounts of water, depending on the nature of the pigment, and to remove the remaining water by the application of heat under well-known conditions, for instance, on trays in an oven. The resulting dry pigments are usually in the form of compact lumps in which the ultimate particles are more or less cemented together. Before these pigments are suitable for use in coating compositions, such as oil or water paints, printing inks, lacquers, linoleum, rubber, etc., it is necessary that they be finely ground. The dry lumps are frequently difficult to grind to a fine powder and the fine powders may require a great deal of additional grinding with the vehicle in order to obtain the required state of subdivision.

There are two inherent difficulties in this prior art procedure. In the first place, when the particles have once been cemented together in the dry state, it is very difficult, if not impossible, to reach by any known grinding process the primary particles originally precipitated. In the second place, such a procedure is uneconomical because the necessary grinding steps consume a great deal of time and energy.

These difficulties are especially pronounced in the case of iron blue pigments which are well-known in the art as being very difficult to grind to any reasonable fine state of subdivision. Iron blue pigments as originally precipitated are believed to exist in an extremely fine state of subdivision but the necessary processes of filtration, washing, and drying have heretofore resulted in pigments in which the primary particles have become aggregated and cemented in such a way as to cause great difficulty in the necessary grinding steps.

Various methods of overcoming these inherent difficulties in the manufacture of dry pigments have been proposed in the past. Among these proposed processes have been several more or less related methods of using certain volatile agents which have been added to the pigment. In one such process, for instance, a water immiscible volatile liquid such as toluene is added to an aqueous paste followed by vigorously agitating the mixture and thereafter drying the same in an oven. Experience has shown, however, that this process is substantially inoperative with many pigments, especially iron blues. Another such process employs certain water miscible agents such as the monobutyl ether of ethylene glycol by adding the same to the aqueous pastes prior to drying. In this case, experience has shown that this process is also inoperative with many types of pigment, especially the organic pigments.

This invention has as an object an improved method for the manufacture of dry pigment material. A further object is a method of manufacturing pigment materials, especially iron blue pigments, of improved texture and in the form of soft finely divided powders. A further object is the use of a new and effective class of cation-active agents. Additional objects will become apparent from an examination of the following description and claims.

These objects are attained according to the herein described invention which broadly comprises incorporating into a pigment prior to the drying of said pigment a petroleum nitrogen base and a volatile solvent, mixing, and thereafter drying the resulting pigment.

In a more restricted embodiment this invention comprises incorporating a petroleum nitrogen base and a volatile solvent boiling between about 60° C. and about 250° C. into an aqueous pigment paste, mixing, and thereafter drying.

The preferred embodiment of this invention comprises adding to a press cake of a pigment about 5%, based upon the weight of the dry pigment, of a reduced nitrogen base, mixing the added agent into the pigment paste, adding to the resulting paste between about 5% and about 20%, based on the weight of the dry pigment, of a volatile solvent boiling between about 60° C. and about 250° C., mixing, and thereafter drying the pigment.

It is a matter of general practice, although not absolutely essential, that before an aqueous suspension of a pigment is dried it shall have been freed as far as possible from any soluble salts which are present. Various methods well-known to those skilled in the art may be employed for removing the soluble salts from the aqueous suspension of the pigment prior to drying.

The application of treating agents to pigments in aqueous suspension may be carried out either before or after the washing step and the type of agent used as well as matters of economy may determine the most desirable point of addition.

Generally speaking, agents which have appreciable water solubility should be applied subsequent to the washing step and preferably to the final press cake just prior to drying. On the other hand, the difficulties of handling the press cake and of obtaining efficient mixing of the treating agent with the paste make it desirable to apply this treatment to the pigment in a slurry form whenever possible.

The petroleum nitrogen bases used as the treating agents in this invention are water-insoluble and may be applied to the pigments at whatever point is most convenient. However, due to the basic nature of the agents, they form water-soluble salts with many acids and in some cases where the pigment slurry may be strongly acidic it is highly preferable to add the agent to the press cake.

In press cake treatments which are, in general, preferred, it may be necessary to thin the washed paste with water to permit efficient agitation and mixing of the agent with the pigment. In any case, however, the nitrogen bases may be added to the paste or slurry either alone or as a solution in a volatile solvent. When the nitrogen base is added alone, the volatile solvent may be added as a separate step. The mixture is vigorously agitated until uniform, having the appearance of a smooth emulsion. Any excess water may be removed by filtration and the final paste is dried by conventional means, such as in an oven at an elevated temperature.

In speaking of "softness" of pigments and "improved texture," it is intended that these terms apply principally as a measure of the ease of incorporation of a pigment into a vehicle such as linseed oil, lithographic varnish, and the like. There are at least two factors in the incorporation of pigments into vehicles, namely, the ease with which the pigment is ground to a sufficiently fine state to eliminate any fine particles which may be seen with the unaided eye, and the ease with which the full color value or strength of the pigment may be obtained. At first glance it would appear that these properties are one and the same but experience has shown that this is not necessarily true and that, frequently, substantially the full color value may be obtained and yet leave many particles large enough to be seen with the unaided eye. These particles are usually spoken of as "grit" and may cause the coating composition film to be deficient in gloss, for instance. According to this invention one may produce pigments which may be ground to give substantially complete freedom from grit and their full color value with the least possible expenditure of energy.

In order that a measure of the improvement resulting from the process of this invention may be possible, the method described by T. J. Craig in "The American Ink Maker," October and November issues, (1938) has been used to evaluate the pigments. In this method, printing inks are made by grinding the pigment into a suitable vehicle, such as a lithographic varnish, on a roller mill with a controlled setting of the clearance between the rolls. Samples of the inks can be taken after any desired number of passes over the mill and these inks are evaluated by pulling down a wedge of ink on a glass slide, as more fully described by Craig in the above reference. Arbitrary standards have been established in which the number 20 has been assigned to an ink which is free from any grit that can be detected with the unaided eye and 11 has been assigned to an ink which shows a very large amount of grit. The intervening numbers have been assigned in such a way as to represent approximately equal gradations in the amount of grit. Thus, a grit rating of 14 or 15 is quite poor, a grit rating of 16 to 17 is of intermediate quality, and a rating of 18 to 19 is considered excellent. Although these ratings are on a purely arbitrary basis, nevertheless, when suitable standards for comparison are available and the grinds are made under controlled conditions they are readily duplicable and are considered to represent an accurate measure of the ease with which the pigment may be incorporated into the vehicle.

In the examples which follow hereafter the grit ratings were made on inks which had been given 2 passes over a loosely set ink mill, the clearance of the rolls having been adjusted to a substantially reproducible point with the aid of feeler gauges. This represents, in general, a very superficial grinding operation and improvements in the ratings should be reflected in real value to the user of the pigments.

This invention may be more readily understood from an examination of the following examples which are given for illustrative purposes and are not intended to place any restrictions or limitations on the herein described invention.

*Example I*

An iron blue slurry containing about 100 gms. of pigment was treated before washing with 7 gms. of petroleum nitrogen bases. The oily agent was added directly to the slurry and the mixture agitated thoroughly for some time before filtering, washing, and drying. There was an improvement of one unit grit rating over an untreated control.

*Example II*

17 gms. of reduced nitrogen bases was added to 1000 gms. of a washed iron blue press cake containing about 250 gms. pigment. The agent was thoroughly mixed into the press cake which was then dried on a tray in an oven at an elevated temperature. The dry pigment gave a grit rating of 19 as compared to 16 for an untreated control.

*Example III*

17 gms. of reduced nitrogen bases was added to 1000 gms. of an iron blue press cake of 25% solids content. The agent was thoroughly mixed into the pigment paste and then 250 gms. of mineral spirits was added and also mixed into the paste after which it was dried at an elevated temperature. The texture improvement was slightly greater than in the preceding Example II. It should be noted here that, in attempts to add the mineral spirits to an untreated press cake, it was impossible to obtain uniform dispersion of the oil throughout the mass whereas in the presence of the reduced nitrogen base the oily material was readily dispersed in the aqueous paste.

*Example IV*

20 gms. of reduced nitrogen bases was thoroughly mixed with 2000 gms. of an iron blue press cake containing about 550 gms. dry pigment. One liter of gasoline was then added to the mixture and thoroughly incorporated therein. The color was then dried in an oven at an elevated temperature and, when incorporated in lithographic varnish, it gave a grit rating of 17 as compared to 16 for an untreated control.

Example V

A chrome yellow slurry suitable for mixing with iron blue to give a chrome green was mixed with about 1% reduced nitrogen bases (based on the solids content of the slurry), filtered and dried at an elevated temperature. An improvement in grit rating of about one unit over an untreated chrome yellow resulted.

Example VI 20 liters of a chrome green slurry containing about 1500 gms. of color on a dry basis was treated with 21 gms. of reduced nitrogen bases. The mixture was thoroughly agitated, filtered, washed and dried at an elevated temperature. The resulting dry color exhibited a pronounced improvement in freedom from grit with a rating of 18 as compared to 15 for the untreated control.

Example VII 2000 gms. of a paste of copper phthalocyanine, a pigment known commercially as "Monastral" Fast Blue BSN, containing about 430 gms. of dry pigment was treated with a solution of 30 gms. reduced nitrogen bases in 25 gms. mineral spirits after being diluted to a volume of about 5000 cc. and the mixture was passed through a colloid mill. The resulting paste was dried in an oven and gave a very soft fluffy powder which exhibited greatly improved texture over the untreated control. The grit rating was 16 compared to 12 for the control.

Example VIII 2000 gms. of a 21.5% paste of copper phthalocyanine was slurried to a total volume of about 5000 cc. and 30 gms. of reduced nitrogen bases was added to the slurry. It was then put through a colloid mill and the resulting paste dried in an oven to a soft fluffy powder substantially free from grit (rating of 17 as compared to 12 for the control) and exhibiting an excellent rate of strength development.

Example IX

About 2000 gms. of a paste of a blue vat dye (known commercially as "Lithosol" Blue GL, chemically mono-chloro-indanthrone) of 17.2% solids content (about 350 gms. dry color) was reslurried to a thin paste. While vigorously agitating the paste, 17 gms. of petroleum nitrogen bases was added and the mixture was then put through a colloid mill three times. The resulting paste had a creamy consistency and was dried in an oven to a soft fluffy powder which was relatively free of grit (rating of 15 against 10 for the control). It exhibited a greatly improved rate of strength development in a printing ink vehicle. A similar experiment, but using reduced nitrogen bases in place of the petroleum nitrogen bases, gave substantially the same grit rating and a still further improvement in rate of strength development.

Example X 1250 gms. of a 16.2% paste of the azo pigment prepared by coupling diazotized para-nitro-ortho-toluidine with the para-chloro-anilide of beta hydroxy naphthoic acid was reslurried to a thin paste. 10 gms. of reduced nitrogen bases was added with good agitation and the mixture was put through a colloid mill three times. The resulting creamy paste was dried in an oven to a soft fluffy powder. When tested in a printing ink vehicle it was substantially free from grit (rating of 18 as compared to 12 for the control). The rate of strength development was excellent.

Example XI

The pigment paste of Example X was reslurried to a thin paste and a mixture of 10 gms. reduced nitrogen bases and 30 cc. of mineral spirits was added thereto under vigorous agitation. Agitation was continued for 15 minutes and the mixture was dried in the oven. When tested in a printing ink vehicle it exhibited a grit rating of 17 as compared to 12 for the control.

It is to be understood that the specific embodiments of this invention may be subjected to modification and variation without departing from the spirit and scope thereof.

Although it is preferred to employ about 5% of the petroleum nitrogen bases, based upon the weight of the dry pigment, it is to be understood that this invention is not limited thereto, since amounts greater or less may be advantageously employed. Thus, an amount as little as about 0.5% has a positive effect and an amount up to about 25% results in definite improvement. Amounts outside the range of between about 0.5% and about 25% produce advantages over prior art treatments although the results are definitely inferior to the products produced when amounts within the aforementioned range are employed. Thus, if an amount less than about 0.5% is employed there is a definite reduced effect and when an amount larger than about 25% is employed various properties of the pigment, such as the tinctorial properties, may be harmed.

This invention is not limited to the particular water-immiscible volatile agents used in the examples above. The only restrictions on this type of agent are that it shall be sufficiently volatile to evaporate in the ordinary drying ovens, that it shall be substantially immiscible with water, and that it shall not dissolve the pigment to any appreciable extent. Agents boiling within the range of about 60° C. and about 250° C. fulfill the desired condition of volatility, and are, therefore, preferred, since agents boiling below 60° C. appear to evaporate more rapidly than the water so that little improvement results and agents boiling above 250° C. may not be completely removed during the drying process. Inasmuch as the petroleum nitrogen bases boil within this temperature range, they may function as a volatile solvent so that additional volatile solvent is not always essential. Furthermore, since the petroleum nitrogen bases are volatile at the usual oven drying temperature, they may evaporate during the drying process. Also, such agents as benzene, butyl alcohol, xylene, tetrachloroethylene, carbon tetrachloride, and the like, may be employed in place of the agents used in the above examples. Noninflammable organic liquids such as carbon tetrachloride have special utility because of the reduced fire hazard. Although it is preferred to employ between about 5% and about 20%, based on the weight of the dry pigment, of the volatile agent, it is to be understood that amounts outside of this range may be employed without departing from the scope of this invention. Thus, amounts between about 1% and about 100% may be advantageously employed. An amount less than 1% is substantially ineffective and amounts substantially greater than 100% offer no advantage in the properties of the resulting pigment.

The examples above include a number of typical pigments both organic and inorganic. Although this invention has special utility with such pigments as iron blues and the like, it is to be understood that it is applicable to pigments generally. The invention thus includes the use of petroleum nitrogen bases in combination with a water immiscible organic liquid, which may be a further amount of the petroleum nitrogen bases, for the treatment of all pigments, including such materials as iron blue, zinc yellow, lead chromate-containing pigments such as chrome yellow, chrome orange, molybdate orange and chrome green, azo pigments such as lithol reds and toluidine reds, phosphotungstic acid pigments of basic dyes, phthalocyanines, vat dyes used as pigments, alumina hydrate lakes, zinc sulfide-containing pigments, titanium-containing pigments, and the like.

The petroleum nitrogen bases are cation-active compounds. Cation-active organic compounds are those in which the large organic nucleus is found in that part of the molecule capable of assuming a positive charge as contrasted to the usual soap-like surface-active compounds in which the large nucleus assumes a negative charge and which may be characterized as anion active compounds. This differentiation is discussed in more detail by H. Bertsch (Zeit. f. angew. Chemie 48, 52 (1935)).

The petroleum nitrogen bases which have been used in the above examples both as cation-active agents and as volatile solvents are basic nitrogen containing compounds, and are by-products of the petroleum refining industry. They are found to some extent in many types of crude petroleum but some crudes contain much larger amounts than others and, in many instances, they have been a by-product for which no ready use has been known. In general, they are complex mixtures of materials which have boiling points so close together that it has been extremely difficult to separate and purify them. The "so-called" reduced nitrogen bases which have been used in some of the examples above are obtained by processes of hydrogenation and purification. The actual chemical change is not known but they are much more powerful agents for the purposes herein related than the crude bases.

The processes disclosed in this invention are useful in the manufacture of all pigments such as those enumerated above. They are especially useful in the manufacture of iron blue pigments of greatly improved texture. The pigments resulting from the processes of this invention are useful in all those varied uses to which powdered dry pigments have been applied.

One of the principal advantages of this invention lies in the discovery of a more effective type of cation-active agent than any heretofore disclosed. A further advantage lies in the possibility of obtaining pigments which are free from any contaminating agent and at the same time obtaining the advantages of the presence of the agent during the drying operation. It may also be of advantage to use an agent which combines the properties of the cation-active agent and a water immiscible volatile agent. These properties are manifested in improved texture and frequently by a considerable increase in the bulk of the dry color.

As many apparently widely different embodiments of this invention may be made without departing from the spirit and scope thereof, it is to be understood that we do not limit ourselves to the specific embodiment except as defined in the appended claims.

Having described the present invention the following is claimed as new and useful:

1. A process for the production of improved pigments which comprises incorporating into a pigment material, prior to drying thereof, a petroleum nitrogen base and a water-immiscible volatile solvent, mixing, and thereafter drying the pigment.

2. A process for the production of improved pigments which comprises incorporating into a pigment material, prior to drying thereof, a petroleum nitrogen base and a water-immiscible volatile solvent boiling between about 60° C. and about 250° C., mixing, and thereafter drying the pigment.

3. A process for the production of improved pigments which comprises incorporating into an aqueous pigment paste a petroleum nitrogen base and a water-immiscible volatile solvent boiling between about 60° C. and about 250° C., mixing, and thereafter drying the pigment.

4. A process for the production of pigments of improved texture which comprises incorporating into an aqueous pigment paste between about 0.5% and about 25%, based on the weight of the dry pigment, of a petroleum nitrogen base, adding to the resulting paste a water-immiscible volatile solvent boiling between about 60° C. and about 250° C., mixing, and thereafter drying the pigment.

5. A process for the production of pigments of improved texture which comprises incorporating into an aqueous pigment paste between about 0.5% and about 25%, based upon the weight of the dry pigment, of a petroleum nitrogen base, adding to the resulting paste between about 1% and about 100%, based upon the weight of the dry pigment, of a water-immiscible volatile solvent boiling between about 60° C. and about 250° C., mixing, and thereafter drying the pigment.

6. A process for the production of pigments of improved texture which comprises incorporating into a colored pigment material, prior to drying thereof, a petroleum nitrogen base and a water-immiscible volatile solvent boiling between about 60° C. and about 250° C., mixing, and thereafter drying the pigment.

7. A process for the production of pigments of improved texture which comprises incorporating into an iron blue pigment material, prior to drying thereof, a petroleum nitrogen base and a water-immiscible volatile solvent boiling between about 60° C. and about 250° C., mixing, and thereafter drying the pigment.

8. A process for the production of pigments of improved texture which comprises incorporating into a phthalocyanine pigment material, prior to drying thereof, a petroleum nitrogen base and a water-immiscible volatile solvent boiling between about 60° C. and about 250° C., mixing, and thereafter drying the pigment.

9. A process for the production of pigments of improved texture which comprises incorporating into an aqueous pigment paste between about 0.5% and about 25%, based upon the weight of the dry pigment, of a reduced nitrogen base, mixing the added agent into the pigment paste, adding to the resulting paste between about 1% and about 20%, based on the weight of the dry pigment, of a volatile solvent selected from the class consisting of mineral spirits, carbon tetrachloride, and petroleum nitrogen bases, mixing, and thereafter drying the pigment.

10. A process for the production of pigments of improved texture which comprises incorporating into an iron blue aqueous paste between about 0.5% and about 25%, based upon the weight of the dry pigment, of a reduced nitrogen base, mixing the added agent into the pigment paste, adding to the resulting paste between about 1% and about 20%, based on the weight of the dry pigment, of a volatile solvent selected from the class consisting of mineral spirits, carbon tetrachloride, and petroleum nitrogen bases, mixing, and thereafter drying the pigment.

11. A process for the production of pigments of improved texture which comprises incorporating into a phthalocyanine aqueous paste between about 0.5% and about 25%, based upon the weight of the dry pigment, of a reduced nitrogen base, mixing the added agent into the pigment paste, adding to the resulting paste between about 1% and about 20%, based on the weight of the dry pigment, of a volatile solvent selected from the class consisting of mineral spirits, carbon tetrachloride, and petroleum nitrogen bases, mixing, and thereafter drying the pigment.

JOHN OWEN MORRISON.
BEN H. PERKINS.